(12) United States Patent
Yassin et al.

(10) Patent No.: US 6,505,780 B1
(45) Date of Patent: Jan. 14, 2003

(54) PERSONALIZE VEHICLE SETTINGS USING RF TAGS

(75) Inventors: Amr F. Yassin, Ossining, NY (US); Yasser alSafadi, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/012,596

(22) Filed: Dec. 5, 2001

(51) Int. Cl.$^7$ .............................................. G06K 19/06
(52) U.S. Cl. ...................................... 235/492; 235/384
(58) Field of Search ................................. 235/384, 492

(56) References Cited

U.S. PATENT DOCUMENTS

| | | |
|---|---|---|
| 5,381,137 A | 1/1995 | Ghaem et al. |
| 5,657,317 A | 8/1997 | Mahany et al. |
| 5,661,651 A | 8/1997 | Geschke et al. |
| 5,724,028 A | 3/1998 | Prokup |
| 5,950,144 A | 9/1999 | Hall et al. |
| 6,032,054 A | 2/2000 | Schwinke |
| 6,049,745 A | 4/2000 | Douglas et al. |
| 6,107,910 A * | 8/2000 | Rickey et al. ............... 235/492 |

FOREIGN PATENT DOCUMENTS

JP                0268390    * 11/1990

* cited by examiner

Primary Examiner—Harold I. Pitts
(74) Attorney, Agent, or Firm—John Vodopia

(57) ABSTRACT

A method of and system for programming one or more personalized settings of a user for adjustable components of a vehicle, by using a communication device capable of communicating data to the vehicle. It includes providing the user with a radio frequency identification (RFID) tag. The RFID tag includes machine-readable information regarding personalized settings of the user for at least one adjustable component of the vehicle. The information from the RFID tag includes the identity of the user. First, information is read from the RFID tag using an RFID reader when the RFID tag is operationally proximate the RFID reader. Next, a profile database is queried to access a personal profile of the user based upon the identity of the user as read from the RFID tag. The personal profile includes personalized settings for each component of the vehicle to be set. The profile database may be remotely located from the vehicle, in which case the profile database is operatively coupled to the receiver via a communication link and the querying step includes querying the profile database via the communication link. Then at least one adjustable component of the vehicle is set based upon the personalized settings from the personal profile accessed from the profile database. Optionally, the personal profile stored on the profile database may be updated when the user completes operation of the vehicle.

18 Claims, 5 Drawing Sheets

PERSONALIZE VEHICLE SETTINGS USING RF TAGS

FIELD OF THE INVENTION

The invention relates to methods and systems for personalizing vehicle settings, by using a communication device capable of communicating data to the vehicle. More specifically, the invention relates to methods and systems for sending information regarding the personalization of vehicle settings using radio frequency ("RF") communication tags.

BACKGROUND OF THE INVENTION

Radio frequency identification tags (hereinafter referred to as "RFIDs") are well-known electronic devices which have uses in many areas. An RFID works by first recording or "burning in" identification or other data on the RFID device. Thereafter, the RFID sends the recorded identification or other information to the RFID reading device. A particular advantage of RFIDs over bar code, optical characters and magnetic storage (such as the magnetic strip on many credit cards) is that the RFID does not require physical contact, or as is the case with optical character and bar code readers, line of sight, between the tag and the reading device to be read.

RFIDs come in two varieties: active and passive. An active RFID includes a battery or other power source, and is activated by a signal from a reading device. The activated RFID then broadcasts its identification or other data, which is picked up by the reading device. An advantage of active RFID's over passive RFIDs is that the inclusion of a power source allows the active RFID to transmit to a receiver without entering into an electromagnetic field to power the tag circuit. Active RFIDs are also generally able to transmit over a longer distance. The advantages of active RFIDs has led to its use in automatic toll-paying systems, or the like. However, an active RFID has certain disadvantages compared to a passive RFID. For example, because the active RFID requires a battery or other power source, it is more expensive and heavier than a passive RFID. Additionally, the active RFID becomes useless when the battery or other power source is depleted.

Passive RFIDs have no power supply per se, but power is provided to the RFID circuitry by using an electromagnetic power receiver. The RFID reading device sends power to the RFID's electromagnetic power receiver, thus powering up or turning on the RFID's circuits. Next, the passive RFID broadcasts a response signal containing identification or other information, which is then read by the reading device. Because the passive RFID has no battery, it is less expensive and lighter. Passive RFIDs have been in use for some time, notably in security access cards where the user holds the card near the card reader to unlock a door, and in clothing stores as security tags attached to clothing items. This technology has not yet been used to personalize the settings for a vehicle.

Automobiles and other vehicles include an array of customizable devices and settings. These include but are not limited to:

Driving Style (Sport, Economy);
Seat/Steering Wheel Adjustment;
Preferred Air Temperature;
Preferred Radio Stations/Programs;
Dash Board Lighting Intensity; and
Cruise Control Default (Off/On).

The conventional methodology is for a person entering a vehicle to physically select his/her preferred settings of these items as they become familiar with the vehicle. For example, a woman entering an automobile might work various levers to position the seat properly for her body type. She might also need to set the steering wheel to an angle for ease of use, adjust the rear and side-view mirrors for her height, select a favorite station on the radio, and/or select any of the additional personal settings. The selection of these settings may take a considerable amount of time. Automatically selecting the personal preferences of a driver is currently done on a limited basis. Systems are in place allowing a relatively small number of keying devices to be customized for each driver, each device capable of communicating setting information to the vehicle. These systems are limited, however to devices requiring actual physical contact with the vehicle, such as mechanical keys, and devices requiring a line-of-sight with a reading device, such as an infra-red key. Moreover, because the physical contact type devices are generally keyed to a particular vehicle, a driver must carry a different such device for each vehicle they drive. This limitation leads to a proliferation of keying devices and becomes impractical on a large scale.

Thus, there is a need and advantage to provide each driver with a keying device that does not require a direct line-of-sight or physical contact with the vehicle. There is also an advantage to allow each driver to carry only one such keying device personalized for his/her use in any combination of different vehicles.

Additionally, many drivers begin driving as quickly as possible upon entering a vehicle, and only begin making the less urgent selections (such as for radio station and volume) after the vehicle is in motion. This greatly increases the likelihood of the driver being distracted while in motion, which, in turn, might lead to a greater probability of a vehicular accident and even injuries.

Therefore, it would be desirable to provide settings to the vehicle (and devices within the vehicle) which instruct the vehicle of certain driver preferences. It would also be desirable to provide these settings with a minimum of driver intervention. It would also be desirable to allow the settings to be provided without requiring the driver to input any code manually, and without requiring the driver to use a device requiring physical contact between a key or card and a reader, such as the case with bar codes, magnetic cards, and infra-red keys.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

To achieve these and other advantages and in accordance with the purpose of the invention, as embodied and broadly described, the invention includes a method of programming one or more personalized settings of a user for adjustable components of a vehicle.

The method involves first providing the user with a radio frequency identification (RFID) tag, which includes machine-readable information regarding the user's personalized settings at least one adjustable component of the vehicle.

Next the information is read from the RFID tag using an RFID reader when the RFID tag is operationally proximate the RFHD reader. Then the component of the vehicle is set based upon the information received by the RFID receiver. The process of setting the component is repeated for each adjustable component for which information is read.

In another embodiment, the information from the RFID tag indicates actual settings for each component to be set during the setting step. This information may then be updated on the RFID after the user completes operation of the vehicle.

Another embodiment of the invention provides an RFID tag containing identity information for the user. Next a profile database is queried to access a personal profile based upon the identity of the user as read from the RFID tag. The personal profile includes the personalized settings of the user for each component of the vehicle to be set during the setting step. Then these settings are to configure each component of the vehicle to be set.

In another embodiment the profile database is remotely located from the vehicle and operatively coupled to a receiver via a communication link. In this embodiment the querying step includes querying the profile database via the communication link. The database may then a be updated with a more current personal profile of the user when operation of the vehicle is over.

Another embodiment the present invention allows selecting the vehicle to be used by the user from a plurality of vehicles, each vehicle having an RFID reader for reading the RFID tags. These vehicles may be of either similar or different type.

The invention also includes a system for programming one or more personalized settings of a user for adjustable components of a vehicle. The system includes an RFID tag encoded with machine-readable information regarding personalized settings of the user for at least one adjustable component of the vehicle, an RFID reader associated with the vehicle for reading the information from the RFID tag when the RFID tag is operationally proximate the RFID reader, and a processor operatively coupled with the RFID reader and with the component of the vehicle, capable of setting the component based upon the information received by the RFID receiver.

In another embodiment, the information encoded on the RFID tag includes the identity of the user and the system also includes a profile database. The profile database stores a personal profile based upon the identity of the user, which includes the personalized settings of the user for each component of the vehicle to be set via the processor. The processor then queries the profile database to access the personal profile of the user based upon the identity of the user as read from the RFID tag. Next, the processor uses the personal profile accessed from the profile database to determine the actual settings for each component of the vehicle to be set.

Another embodiment of the present invention has the profile database remotely located from the vehicle, with a communications link between the vehicle and the profile database.

In another embodiment, the vehicles associated with the plurality of RFID readers include different types of vehicles, and the profile database stores separate personalized settings of the user for each type of vehicle.

It is understood that both the foregoing general description and the following detailed a description are exemplary and are intended to provide further explanation of the invention claimed.

The accompanying drawings, which are incorporated in and constitute part of this specification, and included to illustrate and provide a further understanding of the method and system of the invention. Together with the description, the drawings serve to explain the principles of the invention.

DETAILED DESCRIPTION OF THE PREFERRED EMBODIMENT

The following description is presented to enable any person of ordinary skill in the art to make and use the present invention. Various modifications to the preferred embodiment will be readily apparent to those of ordinary skill in the art, and the disclosure set forth herein may be applicable to other embodiments and applications without departing from the spirit and scope of the present invention and the claims hereto appended. Thus, the present invention is not intended to be limited to the embodiments described, but is to be accorded the broadest scope consistent with the disclosure set forth herein.

In accordance with a preferred embodiment of the invention, a system is provided to personalize vehicle settings, by using a communication device capable of communicating data to the vehicle. More specifically, the system allows for sending information regarding the personalization of vehicle settings using radio frequency communication tags.

Advantageously, the ability to provide each driver of a group virtually unlimited in size with a keying device that does not require a direct line-of-sight or physical contact with the vehicle for such information transfer is presented. Another advantage of the present invention is that each driver needs to carry only one such keying device personalized for use in any of a combination of different vehicles.

Another advantage of the current invention is the ability to provide settings to the vehicle which instruct the vehicle of certain driver preferences. It also advantageously provides these settings with a minimum of driver intervention. Thus the driver is subject to a reduced likelihood of distractions while driving a vehicle, because the settings are provided without requiring the driver to input any code or information manually, and without requiring the driver to use a device requiring physical contact between a key or card and a reader, such as the case with bar codes, magnetic cards, and infra-red keys.

Figure 1:
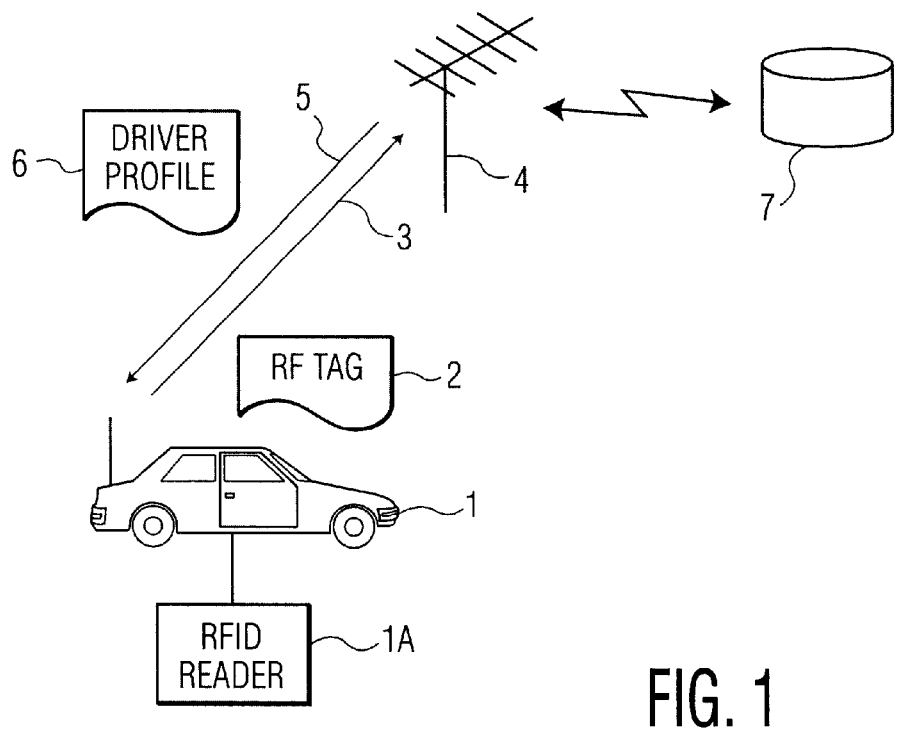
FIG. 1 is a schematic representation of a system for personalizing vehicle settings, by using a communication device capable of communicating data to the vehicle in accordance with a preferred embodiment of the current invention.

FIG. 1 is a schematic representation of a system for personalizing vehicle settings, by using a communication device capable of communicating data to the vehicle 1 in accordance with a preferred embodiment of the current invention. The driver enters the vehicle 1 while carrying an RFID tag 2. The RFID tag is read by an RFID reader 1A associated with the vehicle 1. This information transfer may occur prior to the driver entering the vehicle 1, or after the driver has entered the vehicle 1. RFID readers are well known and come in assorted sizes, shapes, configurations and power requirements (hence "range"), which allows for a variety of placements of an RFID reader in association with a vehicle 1.

The RFID tag 2 may be configured as a key to unlock the door of the vehicle 1, or as in the preferred embodiment, it may be a separate element configured to be fastened to a conventional keychain or carried independently by the driver. The RFID reader is positioned appropriately to the actual implementation of the embodiment. For example, if the RFID tag 2 is used to unlock the doors of the vehicle, the RFID reader should be positioned to allow an RFID tag 2 outside to vehicle to be read. Alternatively, if the RFID tag 2 is not used to unlock the vehicle the RFID reader may be placed inside the vehicle, such as within or near the driver's seat.

Data on or in association with an RFID tag 2 may be used directly to set the customizable devices and settings of the vehicle 1 (henceforth "preferences"). As such, the RFID reader would signal the various customizable devices and settings accordingly. Alternatively, the information read from an RFID tag 2 may be used to identify the driver. In this embodiment, the driver identification information read from the RFID tag 2 is used to query a profile database 7 to extract a driver profile 6 containing the driver's vehicle preferences. The profile database 7 may be kept locally in the vehicle 1, or preferably will be maintained externally, using any suitable component such as a computer processor or the like.

If the profile database is externally maintained, the RFID reader of the vehicle 1 uploads 3 the driver identification information to a tag profile server over a communications channel. The communications channel 4 may be the over Internet or any other communications network, including but not limited to cellular networks, radio networks, or the like which are well known in the art.

The tag profile server receives the uploaded driver identification information and, using known software and hardware, executes a query of the profile database 7 to recover driver profile information 6. The driver profile information 6 is then downloaded 5 to the vehicle 1 via the same or a different communications network, where it then is used to set the driver's vehicle preferences. Driver profile information can include but is not limited to driver preferences regarding:

Driving Style (Sport, Economy);
Seat/Steering Wheel Adjustment;
Preferred Air Temperature;
Preferred Radio Stations/Programs;
Dash Board Lighting Intensity; and
Cruise Control Default (Off/On).

Figure 2:
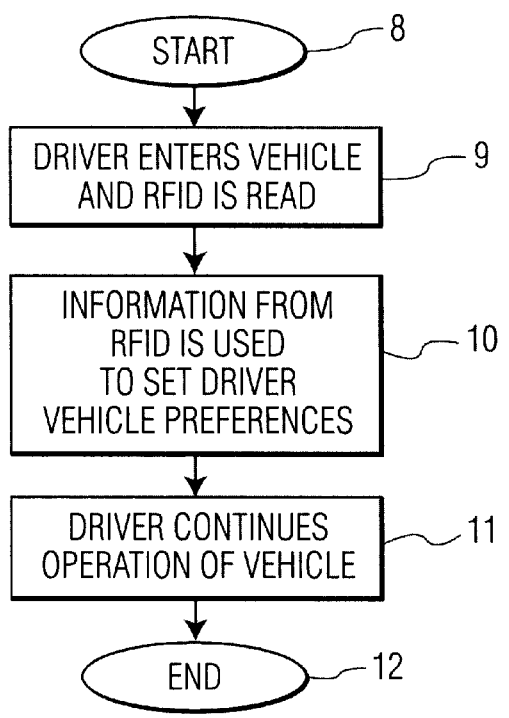
FIG. 2 is a flowchart of the process of reading the RFID device and using its contents to set driver vehicle preferences in accordance with a preferred embodiment of the current invention.

FIG. 2 is a flowchart of a basic process of reading the RFID tag and using its contents to set driver vehicle preferences in accordance with a preferred embodiment of the current invention. The process starts 8 when the driver approaches or enters the vehicle so as to enable the RFID tag containing the driver's vehicle preferences to be read 9. The driver vehicle preferences read from the tag by the RFID reader are then used to set the customizable devices and settings of the vehicle 10. The driver continues operation of the vehicle 11, ending the process 12. Once set, the process is completed.

Figure 3:
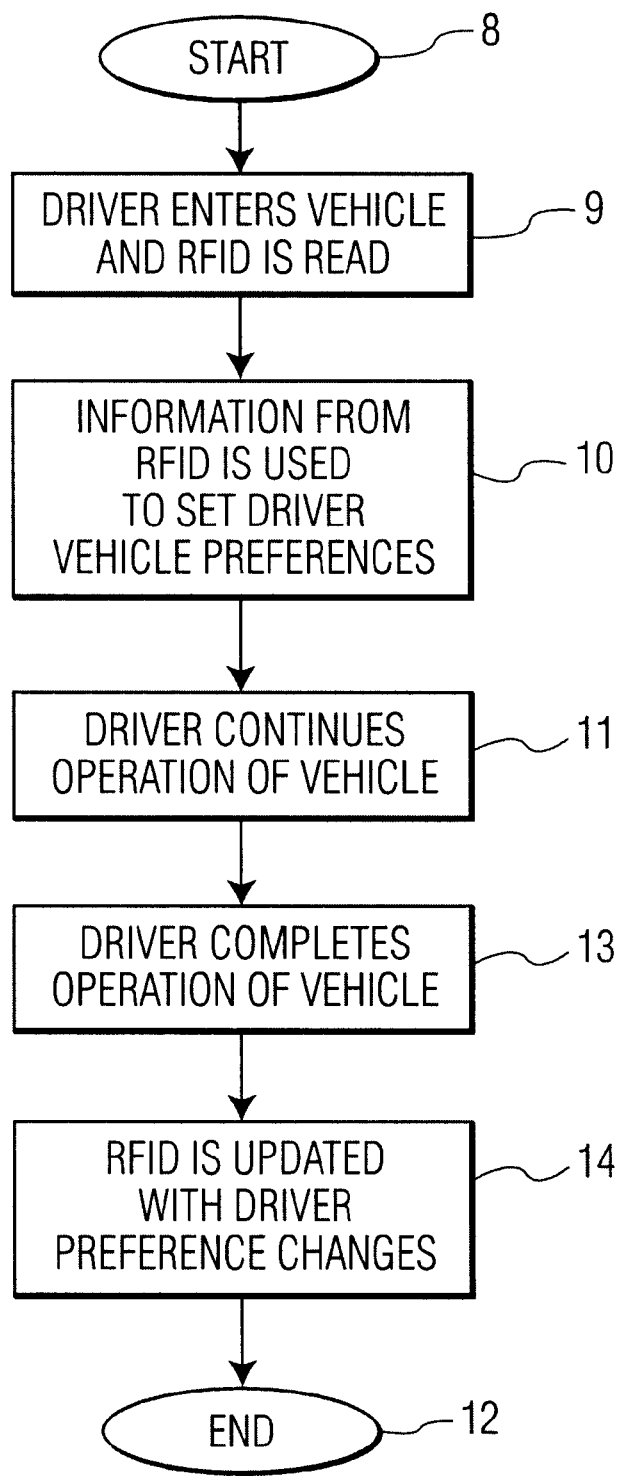
FIG. 3 is a flowchart of the process of reading the RFID device and using its contents to set driver vehicle preferences and further updating the RFID device to reflect driver preference changes in accordance with a preferred embodiment of the current invention.

The process depicted in FIG. 3 is for a similar embodiment, except that the REID tag is updated at the end to reflect any driver preference changes made by the driver. Again, the process starts 8 when the driver approaches or enters the vehicle and the RFID tag is read 9. Next, the information from the RFID tag is used to set the driver's vehicle setting preferences. The driver continues to operate the vehicle 11, during which time the driver can alter various settings. For example, the driver can change the radio station he/she is listening to. Likewise, the driver may adjust his/her seat positioning, air temperature, or any other settings or combination of settings.

Ultimately, the driver will complete his/her operation of the vehicle 13. This may be detected in many ways. For example, the end of the driver's operation of the vehicle may be determined as the time the driver turns the engine off, engages the parking brake, opens the door, or any other obvious suitable action. Whatever method is used to determine that the driver has completed his/her trip, it becomes a trigger to activate the RFID reader and write or store any changes to the driver vehicle preferences onto the RFHD tag 14, ending the procedure 12. It therefore is necessary that the RFID tag and reader be of a type that allows updating the RFID tag information using the RFID reader. There are numerous RFID readers well known and available that are capable of writing to an RFID tag.

Figure 4:
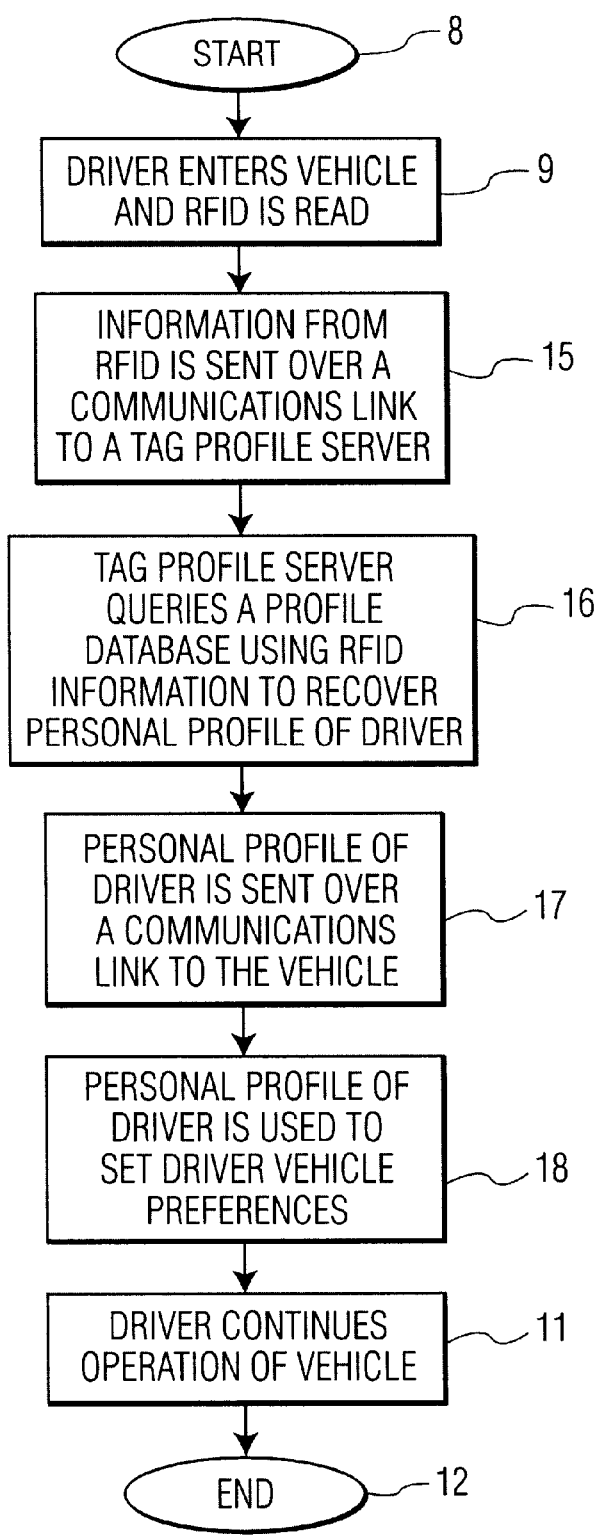
FIG. 4 is a flowchart of the process of reading the RFID device and using its contents to retrieve driver vehicle preferences from a profile database over a communications network in accordance with a preferred embodiment of the current invention.

FIG. 4 flowcharts the process of reading the RFID device and using its contents to retrieve driver vehicle preferences from a profile database over a communications network in accordance with a preferred embodiment of the current invention. This process begins when the driver approaches or enters the vehicle such that the RFID tag is read 9. Information read from the RFID tag is next sent over a communications link to a tag profile server 15. The RFID reader is connected to a computer device or processor within the vehicle to manage the reading and communications equipment of the vehicle. The RFID tag of this embodiment need only contain information identifying the driver, although additional information may be provided if desired. The communications link may be a wireless Internet connection, cellular or PCS™ link, or any other suitable communications network.

The tag profile server receives the RFID tag information identifying the driver and creates a query for the profile database to recover the personal profile of the driver 16. The profile database may be implemented using standard and well known database software and computer hardware. The database query would preferably be implemented using a standard SQL database language, although other proprietary or non-proprietary databases may be used.

The personal profile retrieved by the tag profile server is then sent to the vehicle via the same or different communications network 17, where it is used to set the driver vehicle preferences 18 accordingly. The driver then continues to use the vehicle 11.

In this manner, and in accordance with the present invention, the RFID tag can be used in association with any of a variety of vehicles in a variety of locations. That is, if the personal profile for a particular driver contains his/her preferences for a certain vehicle, then this same information can be used to determine the appropriate customizable settings for all other vehicles of a similar make or model. Also, if the driver has a personal preference for a radio station in a particular location, then the personal profile can be used to set the desired station whenever the driver is in town, regardless of the vehicle used.

Figure 5A:
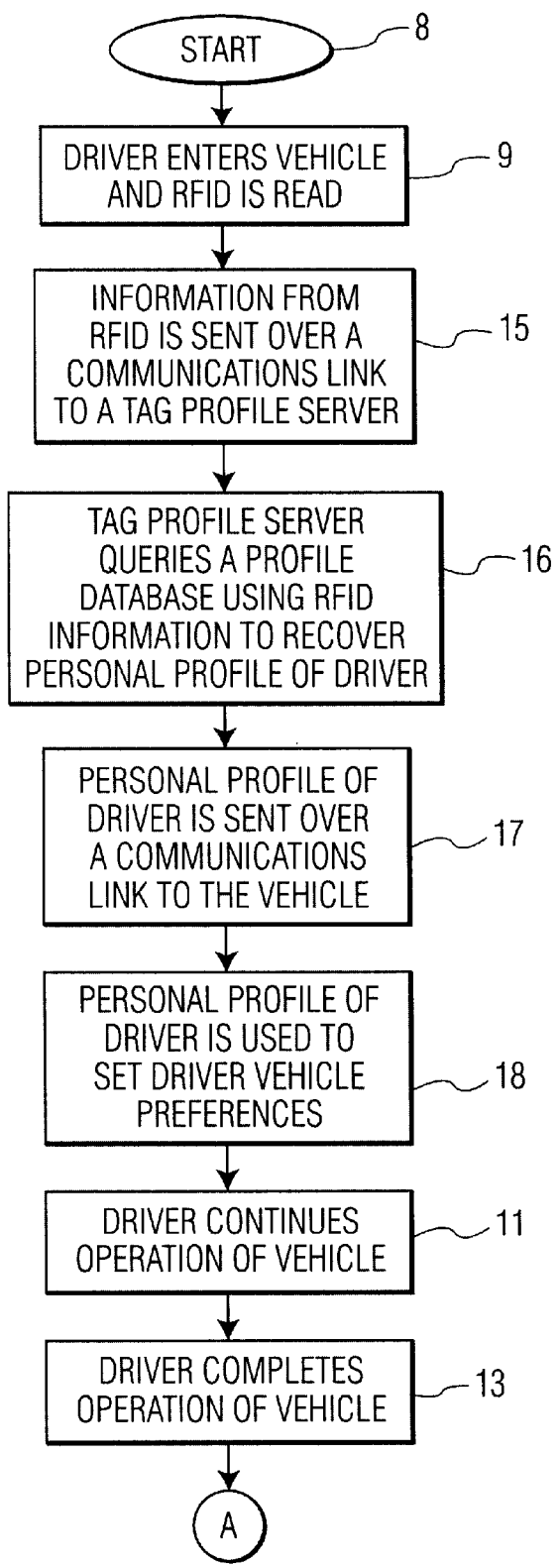
FIGS. 5(a) and 5(b) is a flowchart of the process of reading the RFID device and using its contents to retrieve driver vehicle preferences from a profile database over a communications network, and further updating the profile database to reflect changes to driver preferences in accordance with a preferred embodiment of the current invention.
Figure 5B:
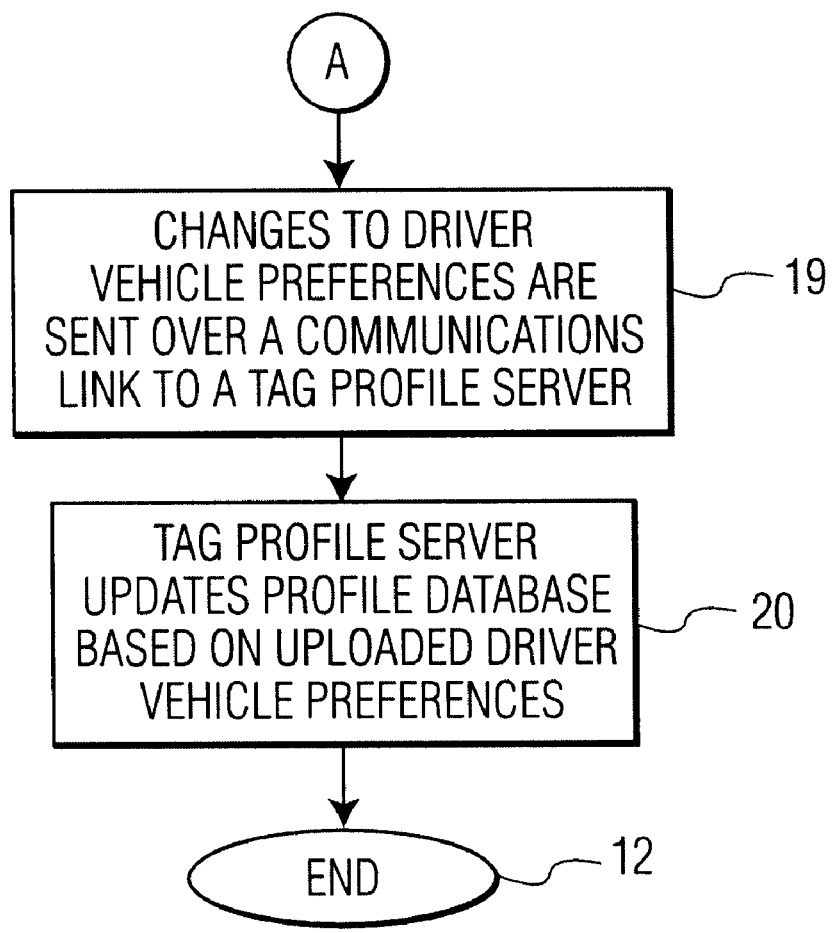

FIGS. 5(a) and 5(b) flowcharts a similar process to that depicted in FIG. 4, except that the process continues until the driver completes his/her operation of the vehicle 13. Next, any changes made to the driver's vehicle preferences are sent over the communications link to the profile tag server 19. Of course, additional information, such as the driver's identification information, as well as other required or desired information are sent to the profile tag server as well. Other information that might be sent may include an identification of the vehicle itself.

Finally, the profile tag server updates the profile database for the driver, based on the updated driver vehicle preferences 20, ending the procedure 12.

It will be apparent to those skilled in the art that various modifications and variations can be made in the method and system of the present invention without departing from the spirit and scope of the invention. Thus, it is intended that the present invention include modifications and variations that are within the scope of the appended claims and their equivalents.

What is claimed is:

1. A method of programming one or more personalized settings of a user for adjustable components of a vehicle, the method comprising the steps of
    providing the user with a radio frequency identification (RFID) tag, the RFID tag including machine-readable information regarding personalized settings of the user for at least one adjustable component of the vehicle;
    reading the information from the RFID tag using an RFID reader when the RFID tag is operationally proximate the RFID reader; and
    setting the component of the vehicle based upon the information received by the RFID receiver.

2. The method of claim 1, wherein the information from the RFID tag indicates actual settings for each component to be set during the setting step.

3. The method of claim 1, further comprising the steps of:
    determining when the user completes operation of the vehicle; and
    updating the information from the RFID tag to indicate changes made by the user to the personalized settings when operation of the vehicle is completed.

4. The method of claim 1, wherein the information from the RFID tag includes the identity of the user; the method further comprising the steps of
    querying a profile database to access a personal profile based upon the identity of the user as read from the RFID tag, the personal profile including the personalized settings of the user for each component of the vehicle to be set during the setting step; and
    using the personal profile accessed from the profile database to indicate actual settings for each component of the vehicle to be set during the setting step.

5. The method of claim 4, wherein the profile database is remotely located from the vehicle and the profile database is operatively coupled to the receiver via a communication link, the querying step including querying the profile database via the communication link.

6. The method of claim 4, further comprising the steps of:
    determining when the user completes operation of the vehicle; and
    updating the personal profile of the user on the profile database to indicate changes made by the user to the personalized settings when operation of the vehicle is completed.

7. The method of claim 4, further comprising the step of:
    selecting the vehicle to be used by the user from a plurality of vehicles, each vehicle having an RFID reader associated therewith for reading RFID tags.

8. The method of claim 7, wherein the plurality of vehicles includes different types of vehicles, the profile database storing separate personalized settings of the user for each type of vehicle.

9. A system for programming one or more personalized settings of a user for adjustable components of a vehicle, the system comprising:
    a radio frequency identification (RFID) tag encoded with machine-readable information regarding personalized settings of the user for at least one adjustable component of the vehicle;
    an RFID reader associated with the vehicle for reading the information from the RFID tag when the RFID tag is operationally proximate the RFID reader; and
    a processor operatively coupled with the RFID reader and with the component of the vehicle, the processor capable of setting the component based upon the information regarding the personalized settings received by the RFID receiver.

10. The system of claim 9, wherein the information encoded on the RFID tag indicates an actual setting for each component to be set via the processor.

11. The system of claim 9, wherein the processor is further operatively coupled to determine when the user completes operation of the vehicle and to update the information encoded on the RFHD tag to indicate changes made by the user to the personalized settings when operation of the vehicle is completed.

12. The system of claim 9, wherein the information encoded on the RFID tag includes the identity of the user; the system further comprising a profile database operatively coupled with the processor, the profile database storing a personal profile based upon the identity of the user, the personal profile including the personalized settings of the user for each component of the vehicle to be set via the processor; wherein the processor is further capable of
    querying the profile database to access the personal profile of the user based upon the identity of the user as read from the RFID tag, and
    using the personal profile accessed from the profile database to indicate actual settings for each component of the vehicle to be set.

13. The system of claim 12, wherein the profile database is remotely located from the vehicle, the profile database being operatively coupled with the receiver via a communication link, wherein the processor queries the profile database via the communication link.

14. The system of claim 12, wherein the processor is further operatively coupled to determine when the user completes operation of the vehicle and to update the personal profile of the user on the profile database to indicate changes made by the user to the personalized settings when operation of the vehicle is completed.

15. The system of claim 12, further comprising a plurality of RFID readers, each associated with a different vehicle and operatively coupled with the profile database.

16. The system of claim 15, wherein the vehicles associated with the plurality of RFID readers include different types of vehicles, the profile database storing separate personalized settings of the user for each type of vehicle.

17. A method of programming one or more personalized settings of a user for adjustable components of a vehicle, the method comprising the steps of:

providing the user with a radio frequency identification (RFID) tag, the RFID tag including machine-readable information regarding personalized settings of the user for at least one adjustable component of the vehicle, the information from the RFID tag including the identity of the user;

reading the information from the RFID tag using an RFID reader when the RFID tag is operationally proximate the RFID reader;

querying a profile database to access a personal profile of the user based upon the identity of the user as read from the RFID tag, the personal profile including personalized settings for each component of the vehicle to be set, wherein the profile database is remotely located from the vehicle and the profile database is operatively coupled to the receiver via a communication link, the querying step including querying the profile database via the communication link;

setting at least one adjustable component of the vehicle based upon the personalized settings from the personal profile accessed from the profile database;

determining when the user completes operation of the vehicle; and updating the personal profile of the user on the profile database to indicate changes made by the user to the personalized settings when operation of the vehicle is completed.

18. The method of claim 17, further comprising the step of:

selecting the vehicle to be used by the user from a plurality of vehicles, each vehicle having an RFID reader associated therewith for reading RFID tags, wherein the plurality of vehicles includes different types of vehicles, the profile database storing separate personalized settings of the user for each type of vehicle.

\* \* \* \* \*